United States Patent
Seiden

(10) Patent No.: US 7,443,883 B2
(45) Date of Patent: Oct. 28, 2008

(54) METHOD AND SYSTEM OF PROVIDING CUSTOMER PREMISE EQUIPMENT CODE

(75) Inventor: Joshua A. Seiden, Highlands Ranch, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 637 days.

(21) Appl. No.: 11/005,788

(22) Filed: Dec. 7, 2004

(65) Prior Publication Data

US 2006/0123453 A1    Jun. 8, 2006

(51) Int. Cl.
H04L 12/28 (2006.01)
H04J 3/16 (2006.01)
H04H 20/28 (2008.01)
H04N 7/173 (2006.01)

(52) U.S. Cl. .................. 370/468; 370/254; 370/465; 370/486; 725/92; 725/94; 725/103; 725/95

(58) Field of Classification Search .......... 370/485, 370/486, 487, 241, 465, 395.2, 395.3, 468, 370/412, 466, 467, 395.21, 352; 709/220; 725/4, 16, 46, 54, 74, 82, 91, 103, 105, 111, 725/114, 115

See application file for complete search history.

(56) References Cited

U.S. PATENT DOCUMENTS

| | | | | | |
|---|---|---|---|---|---|
| 5,594,490 | A | * | 1/1997 | Dawson et al. | 725/67 |
| 5,666,293 | A | * | 9/1997 | Metz et al. | 709/220 |
| 5,734,822 | A | * | 3/1998 | Houha et al. | 717/167 |
| 6,594,305 | B1 | * | 7/2003 | Roeck et al. | 375/222 |
| 6,598,057 | B1 | * | 7/2003 | Synnestvedt et al. | 707/200 |
| 7,278,152 | B1 | * | 10/2007 | Rao | 725/91 |
| 7,293,078 | B2 | * | 11/2007 | Danforth | 709/222 |

* cited by examiner

Primary Examiner—Hanh Nguyen
(74) Attorney, Agent, or Firm—Brooks Kushman P.C.

(57) ABSTRACT

A method and system for providing customer premise equipment (CPE) code to one or more pieces of CPE in a cable system having a national code repository (NCR) in communication with a number of headend units, wherein the headend units deliver code received from the NCR to the one or more pieces of CPE.

18 Claims, 1 Drawing Sheet

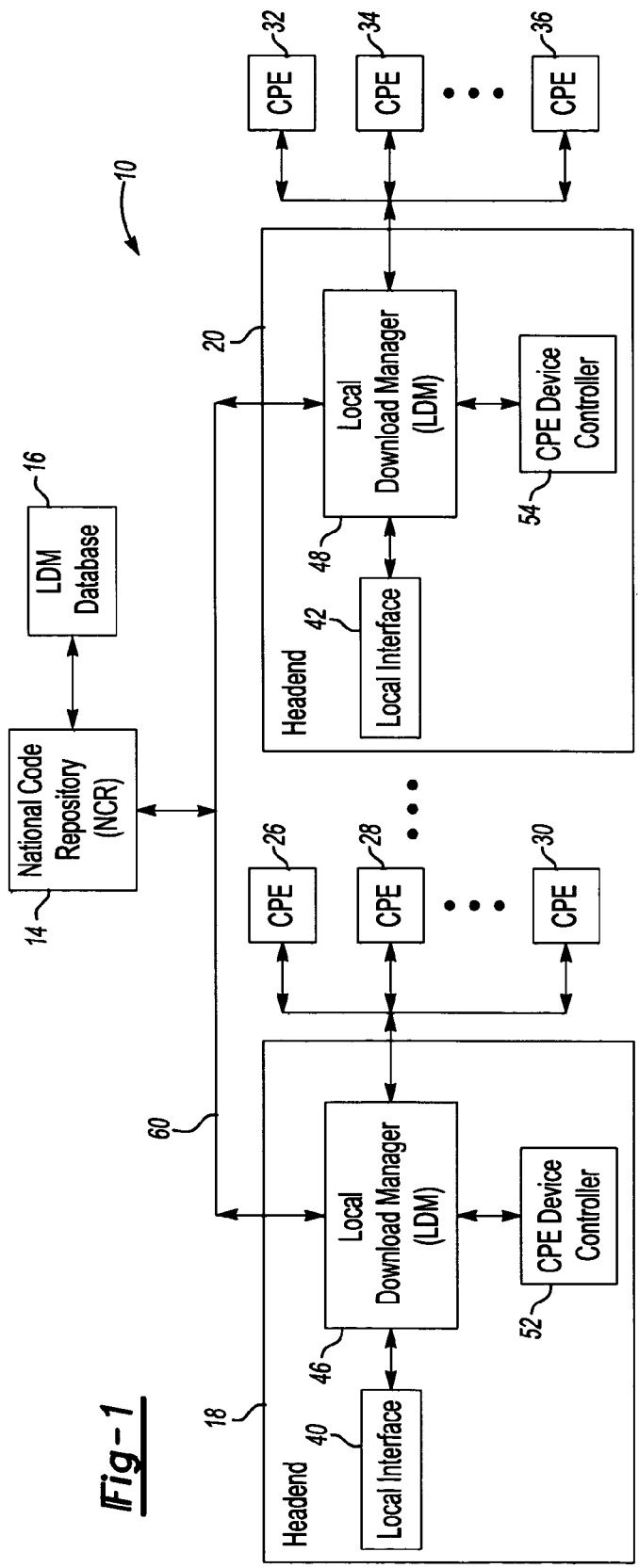
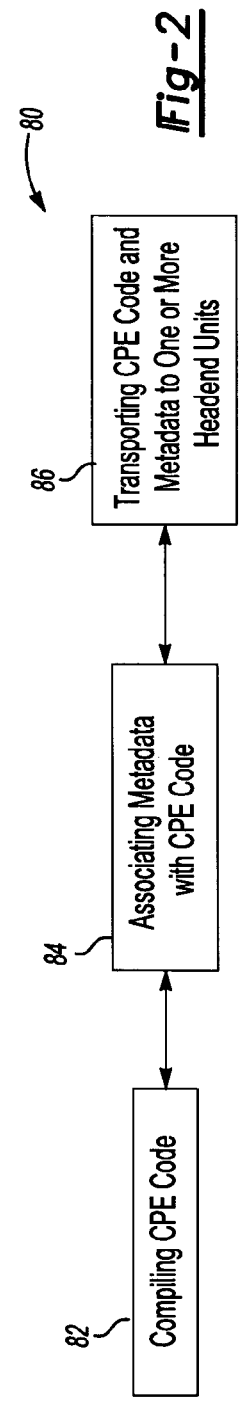

METHOD AND SYSTEM OF PROVIDING CUSTOMER PREMISE EQUIPMENT CODE

BACKGROUND OF THE INVENTION

1. Field of the Invention

The present invention relates to methods and systems of providing customer premises equipment (CPE) code to one or more pieces of CPE.

2. Background Art

Known cable systems employ a headend unit for delivering signals to one or more pieces of customer premises equipment (CPE) of cable service subscriber. The one or more pieces of CPE convert the signals for use by the subscriber, such as to view cable television signals and to provide other services.

The pieces of CPE typically either include one or both of a settop box (STB) unit, which provides the viewing of the cable television signals, and/or a cable modem, which provides the means for connection with the network. Each piece of CPE typically requires CPE code, generally computer, software, or other programmable logic, for configuring, programming, directing, controlling, and manipulating other operations of the CPE.

Because such cable systems may be required to support millions of pieces of CPE, there is a need to provide the CPE code to the pieces of CPE in an efficient manner.

SUMMARY OF THE INVENTION

The present invention relates to providing customer premise equipment (CPE) code to one or more pieces of CPE in a cable network. Preferably, the cable network includes one or more headend units for delivering signals to a plurality of pieces of CPE.

In one aspect of the present invention, the CPE code is compiled and associated with metadata at a national code repository (NCR). The metadata preferably includes instructions for specifying transmission protocols and other optional transport instructions for providing the headend units with instructions for delivering the CPE code to one or more pieces CPE.

In one aspect of the present invention, the CPE code is transmitted from the NCR to one or more headend units. Upon receipt of the CPE code, the one or more headend units preferably, automatically deliver the CPE code to one or more pieces of CPE according to instructions included within the metadata. In this manner, the present invention is able to alleviate manual processing of the CPE code at the one or more headend units transported the CPE code.

In one aspect of the present invention, the CPE code is tested and verified at the NCR prior to being distributed therefrom to the one or more headend units. In this manner, the present invention is able to alleviate testing and verifying of the CPE code at the one or more headend units transported the CPE code.

In one aspect of the present invention, the CPE code transported to the one or more headend units is modified with local code prior to transporting the CPE code to one of the one or more pieces of CPE, such as to add local programming information and the like In one aspect of the present invention, CPE device controller information for one or more headend units is transported the by the NCR for determining operating parameters for the one or more pieces of CPE supported by the headend units transported the CPE code. The NCR preferably selects the metadata associated with the CPE code according to the CPE device controller information so as to properly determined the metadata having instructional rules required to support the operating parameters of the pieces of CPE of the headend units transported the CPE code.

In accordance with one aspect of the present invention, each headend unit includes a local download manager (LDM) in communication with the NCR for transporting the CPE code to the pieces of CPE according to instructions provided in the metadata.

The above features and advantages, along with other features and advantages of the present invention, are readily apparent from the following detailed description of the invention when taken in connection with the accompanying drawings.

BRIEF DESCRIPTION OF THE DRAWINGS

FIG. 1 illustrates a system for providing customer premise equipment (CPE) code in accordance with one aspect of the present invention; and FIG. 2 illustrates a flowchart of method for providing CPE code to pieces of CPE in accordance with one aspect of the present invention.

DETAILED DESCRIPTION OF THE PREFERRED EMBODIMENT(S)

FIG. 1 illustrates a system 10 for providing customer premise equipment (CPE) code in accordance with one aspect of the present invention. The system 10 includes a national code repository (NCR) 14, a local download manager (LDM) database 16, a number of headend units 18-20, and a number of pieces of CPE 26-36.

The headend units 18-20 further include local interfaces 40-42, LDMs 46-48, and CPE device controllers 52-54. The headend units 18-20 are typically regionally located units that provide cable service signals to the pieces of CPE 26-36 in their area. The system 10 shown in FIG. 1 only illustrates two headend units 18-20, however, a larger area, such as the continental United States, may include upwards of 500 headend units to support millions of pieces of CPE and is contemplated by the present invention.

In more detail, the headend units 18-20 receive content, data, and other signals from outside sources and convert them to an appropriate medium for delivery to one or more pieces of CPE. Within each headend unit 18-20, the CPE device controllers 52-54 manages the delivery of data and configuration signals, i.e. channel maps, authorizations, etc., for each CPE 26-36.

In accordance with one aspect of the present invention, the NCR 14 supports the CPE code needs of each CPE 26-36 in the system 10. In particular, the NCR 14 provides CPE code to each headend unit 18-20, such as to all 500 headend units in the United States. The NCR 14 is preferably a database having a processor, memory, or other similar items (not shown) for processing, storing, and transmitting data over a network or other communication mediums to the headend units.

In FIG. 1, the NCR 14 communicates with the headend units over a communication medium 60. The communication medium 60 may comprise any communication infrastructure, such a cable and telephone lines, wireless RF or satellite systems, and the like. Of course, the present invention is not intended to be limited to any transmission medium and contemplates other mediums may be used.

In communication with the NCR 14, is the LDM database 16. The LDM database 16 stores data relating to the various LDMs 46-48 in the system 10, namely the LDMs 46-48 utilized by each headend unit 18-20 supported by the NCR 14. The operation of the LDM database 16 is described below in more detail.

LDMs 46-48 are provided on each headend unit 18-20 for interfacing with the NCR 14. Like the NCR 14, the LDMs 46-48 are preferably configured to transmit and receive signals over the communication medium 60, such as to communicate with the NCR 14. In general, the LDMs 48-50 receive CPE code from the NCR 14 and transport the CPE code to the pieces of CPE 26-36 supported by the headend units 18-20 according to metadata instructions included with the CPE code. In this manner, the NCR 14 is a centralized source for distributing CPE code and metadata to the headend units 18-20 in the system 10, which in turn distributed the CPE code to the pieces of CPE 26-36 they support.

In communication with the LDMs 46-48 are the local interfaces 4042 and CPE device controllers 52-54. The local interfaces 40-42 are input devices, such as computers and the like, for manipulating the CPE code and metadata provided from the NCR 14 to the LDMs 46-48. The interfaces 40-42 allow operators at each headend unit 18-20 to manipulate the CPE code as needed, such as for adding local area channels maps, graphical user interfaces (GUIs), electronic programming guides (EPGs), and the like.

The CPE device controllers 52-54 are local controllers that track operating parameters, such as a device type, transport type, and other information/characteristics, of the pieces of CPE 26-36 supported by the headend units 18-20. The CPE controllers 52-54 keep track of the different operating characteristics to facilitate the control thereof and the transmission of CPE code thereto and therefrom as some headend units may be required to support a variety of pieces of CPE 26-36 provided by various vendors or different versions of the same type of CPE, such as legacy and new pieces of CPE 26-36.

The pieces of CPE 26-36 may include all variety of electronic devices, including settop boxes and cable modems. In addition, as developments in cable television and data transmission continue, other devices, such as digital video recorders (DVR) and the like may also be supported with CPE code delivered from the headend units 18-20. As such, the present invention contemplates a number of uses for delivering CPE code from the headend units 18-20 to the pieces of CPE 26-36.

FIG. 2 illustrates a flowchart 80 of method for providing CPE code to pieces of CPE in accordance with one aspect of the present invention. The method generally relates to downloading or otherwise distributing the code from a NCR to pieces of CPE. This method of centralized distribution is advantageous for a number of reasons, and preferably because it provides an efficient process for delivering the CPE code to pieces of CPE. In particular, the present invention ameliorates interaction and manipulation required by headend units in order to transport the CPE code to pieces of CPE.

Block 82 relates to compiling CPE code for delivery to one or more pieces of CPE. The CPE code preferably relates to software, logic, objects, platform code, middleware, application, and other forms of data, code, objects, and code sets that may be configured or otherwise utilized for controlling, programming, initializing, authorizing, and directing CPE operation. The CPE code preferably includes operating system/firmware, middleware, and applications for settop boxes and other home devices, as well as configuration files for cable modems, etc., depending on the needs of the CPE.

The CPE code may be compiled in a number of different operations and for any number of applications or version of CPE, including updated CPE code for replacing CPE code currently operating on one or more pieces of CPE. In one aspect of the present invention, the CPE code may relate to vendor specific operating parameters for one or more pieces of CPE in the system such that the CPE code is determined from the vendors, such as by the vendor providing the NCR with a disc having the CPE code or otherwise transporting the code thereto, such as over a network or other electronic medium. In another aspect of the present invention, the CPE code may relate to system services or proprietary services of the system provider such that the CPE code is determined by programmers at the NCR or in communication therewith. Of course, the present invention is not intended to be limited to these examples and other sources for determining the CPE code are contemplated.

Preferably, the compiling of the CPE code includes testing and verifying the integrity and operability of the CPE code. In particular, the present invention contemplates operators at the NCR testing, and in some cases, adjusting the CPE code if errors are found so that the CPE code is preferably debugged prior to distributing it to the headend units. In another aspect of the present invention, vendor code having errors is preferably returned to the vendors for correction and further testing. In another aspect of the present invention, operators at the NCR may adjust the vendor code according to the specification of the cable system. This can be advantageous when compiling CPE code provided by vendors so that the integrity of such code may be verified prior to distribution, i.e. for viruses and the like. In this manner, the present invention is able to provide a tested and verified copy of the CPE code and code sets to the headend units without requiring operators at the headend unit to test and verify the code. This can be advantageous in system having a number of headend units as it eliminates the need of each headend unit to test and verify the CPE code.

In accordance with one aspect of the present invention, the CPE code compiling may be instigated by one of the LDMs transmitting a CPE code request to the NCR. The CPE code request may be transmitted for any number of reasons, such a the LDM being requested to support a newly initialized CPE and/or a CPE having a new configured which is not currently supported by the LDM, i.e. the LDM is unable to utilize its existing CPE code to provision the CPE, and/or if a customer using the CPE selects option on the CPE for upgrading service and the like that requires additional CPE codes for operation. In accordance with another aspect of the present invention, downloads may be structured so that if a particular authorization is delivered from the CPE device controller, it would force the CPE to download specific code, in which case the LDM would preferably be configured to know about this authorization so that the appropriate code download request may be made. In response to receiving the CPE code request, which preferably includes identifying characteristics of the requesting LDM and CPE, the NCR preferably consults a LDM database to select CPE code therefrom to support the request and/or it may request operators at the NCR to otherwise located or program the desired code.

Block 84 relates to associating metadata with the CPE code. The metadata relates to rules of operation and protocol for the CPE code. In particular, the metadata includes instructions for instructing the various LDMs that may be responsible for transporting the CPE code with instructions for the transportation of the CPE code from the headend unit to the CPE, such as by specifying a transmission protocol. Preferably, the metadata includes rules for direction operation of the LDM in such a manner that the LDM is able to automatically transport the CPE code and CPE code sets by using instructions in the metadata to the desired pieces of CPE without requiring manual interaction at the headend unit lever.

In accordance with one aspect of the present invention, the metadata is preferably generated by operators at the NCR according to information provided by the various CPE device controllers in the system. In this manner, the present invention is able to tailor the CPE code to meet the needs of the pieces of CPE. Preferably, a common set of metadata is provided at the NCR for similarly configured pieces of CPE so that sets of CPE code and metadata may be used across the network.

In some cases, the metadata may include a number of instructional sets for regulating the transportation of the CPE code from the LDMs to the CPEs. In particular, one set of CPE code may be transported from the NCR with multiple sets of metadata in order to support CPEs having differing operating parameters such that a signal download of CPE code and metadata may be conducted between the NCR and one of the LDMs in order to provide code to each piece of CPE supported thereby. In addition, the metadata preferably includes instructions for specifying which one or more of the pieces of CPE supported by the headend unit are to receive the CPE code such that individual pieces of CPE supported by the same headend unit may be specified and independently delivered CPE code.

In accordance with one aspect of the present invention, the metadata may be associated with information gathered from the CPE device controllers, such as by the NCR polling the various CPE device controllers. In this manner, the CPE device controllers may provide operations data to the NCR that operators in the NCR may then use when associating metadata with the CPE code, such as transport type information related to the means by which data is transported from the LDM to the pieces of CPE, i.e. whether the transport type is in-band, out-of-band, according to the Data-Over-Cable Service Interface Specification (DOCSIS) or DOCSIS of settop gateway (DSG) protocols, and the like, which may also be included in the CPE code request described above. However, operators at the NCR may determine the instructional metadata without polling the CPE device controllers, such as by using known data and/or the metadata may be automatically selected by the NCR, i.e. without operator instructions, from currently available metadata according to data included within the CPE code request. Likewise, the NCR may include a program or other logic for automatically generating the metadata and associating it with the CPE code according to data included within the CPE code request.

Preferably, the LDM database stores a copy of all CPE code and the metadata associated therewith that is operational in the system. This allows for central reporting of where specific CPE code is deployed and how, such as for use with subsequent CPE code downloads, metadata association, troubleshooting, and any number of other operations.

Block 86 relates to transporting the CPE code and associated metadata to the LDMs for delivery to the pieces of CPE. In accordance with one aspect of the present invention, the CPE code is preferably automatically transported to the pieces of CPE by the LDMs according to instructions included in the metadata. However, the present invention contemplates that some manipulation of the CPE code may be required at the headend unit level, such as by the CPE device controller performing operations specified in the metadata rules for delivering the CPE code to the pieces of CPE, such as by setting transport protocols or other operating parameters of the code based on the pieces of CPE receiving the code, and/or by an operator utilizing the local interface to insert locally specified code into the CPE code or to replace portions of the CPE code with locally specified code.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing customer premise equipment (CPE) code to one or more pieces of CPE in a cable network having a plurality of headend units for delivering signals to a plurality of pieces of CPE, the method comprising:
    storing the CPE code at a national code repository (NCR);
    issuing a transport type inquiry from the NCR to a plurality of the headend units to determine transport types supported therewith;
    generating metadata to support the transport types indicated in responses to the transport type inquiry;
    associating the metadata with the CPE code in order to specify transmission protocols required for the transport types supported by the headend units for delivering the CPE code to the CPE;
    transporting the CPE code and metadata to headend units for delivery to the CPE; and
    determining CPE device controller information for the headend units, the CPE device controller information specifying operating parameters for the CPE, and selecting the metadata to support the operating parameters specified in the CPE device controller information.

2. The method of claim 1 further comprising issuing a CPE code request from the headend units prior to transporting the CPE code thereto, wherein the CPE code request specifies the transport types supported by the headend unit issuing the CPE code request.

3. The method of claim 1 further comprising modifying the CPE code transported to the headend units with local code prior to transporting the CPE code to CPE.

4. The method of claim 1 further comprising automatically delivering the CPE code from the headend units to the CPE according to instructions included within the metadata so as to alleviate manual processing of the CPE code at the headend units transported the CPE code.

5. The method of claim 1 wherein storing the CPE code includes testing and verifying the CPE code so as to alleviate testing and verifying of the CPE code at the headend units.

6. The method of claim 1 further comprising receiving the CPE code from a vendor of a cable service provider for storing so that the vendor need not deliver the CPE code to each headend unit.

7. The method of claim 1 further comprising storing updated CPE code at the NCR for transport to one or more pieces of CPE.

8. The method of claim 7 further comprising associating updated metadata with the updated CPE code to specify transmission protocols required by the headend units for delivering the updated CPE code to the CPE.

9. The method of claim 8 further comprising transporting the updated CPE code and metadata to the headend units for delivery to the CPE.

10. The method of claim 9 further comprising storing the CPE code and the updated CPE code on a database associated with the NCR.

11. A system for pro viding customer premise equipment (CPE) code to CPE in a cable network having headend units for delivering signals to a plurality of pieces of CPE, the system comprising:

a national code repository (NCR) for storing the CPE code and associating metadata with the CPE code, the metadata specifying different transmission protocols required by the headend units for delivering the CPE code to the CPE;

a local download manager associated with each headend unit, each local download manager being in communication with the NCR to facilitate transporting the CPE code to the CPE associated therewith according to instructions provided in the metadata;

wherein each local download manager provides the NCR with the transmission requirements of the associated headend unit; and a CPE device controller at each headend unit for controlling operating parameters of the CPE supported therewith, each CPE device controller issuing CPE device controller information for specifying operating parameters for the one or more pieces of CPE, the operate parameters for use by the NCR in selecting the initiate associated with the CPE code so that the selected metadata supports the operating parameters of the one or more pieces of CPE of the one or more headend units transported the CPE code.

12. The system of claim 11 further comprising a local interface at each headend unit for locally manipulating the CPE code transported thereto.

13. A method of delivering code used to program operations of customer premise equipment (CPE) in a system where cable television headend units transmit the code to the CPE, the method comprising:

storing different sets of code at a national code repository (NCR), the different sets of code being used to program the CPE according to different CPE programming requirements;

storing different sets of transmission instructions at the NCR, the transmission instructions being used to instruct the headend units to automatically transmit the code to the CPE according to different CPE transmission requirements and headend transmission capabilities;

upon determining a need to transmit code to one of the pieces of CPE, selecting an appropriate set of code and transmission instructions from the stored sets of code and transmission instructions, the appropriate set of code and transmission instructions being sufficient to support the programming requirements of the CPE, the transmission requirements of the CPE, and the transmission capabilities of the headend unit used to transmit the code to the CPE; and transmitting the appropriate set of code and transmission instructions from the NCR to the headend unit used to transmit the code to the CPE, the appropriate set of code and transmission instructions allowing the headend unit to automatically transmit the code to the CPE according to the transmission requirements of the CPE and the transmission capabilities of the headend unit.

14. The method of claim 13 further comprising determining the CPE transmission requirements and headend transmission capabilities as a function of information collected from the headend units by the NCR in a polling operation.

15. The method of claim 13 further comprising selecting different transmission instructions for the same type of CPE if the CPE is transmitted instructions from the same headend unit and the CPE has different transmission requirements, the different transmission instructions being selected to compensate for the different CPE transmission requirements.

16. The method of claim 13 further comprising selecting different transmission instructions for the same type of CPE if the CPE is transmitted instructions from different headend units and the headend units have different transmission capabilities, the different transmission instructions being selected to compensate for the different transmission capabilities of the headend units.

17. The method of claim 13 further comprising automatically selecting and transmitting new code from the NCR to one of the pieces CPE in response to user inputs at the CPE.

18. The method of claim 17 further comprising the CPE automatically implementing the new code without checking or confirming that the new code is error free.

* * * * *

UNITED STATES PATENT AND TRADEMARK OFFICE
CERTIFICATE OF CORRECTION

PATENT NO.        : 7,443,883 B2                                    Page 1 of 1
APPLICATION NO.   : 11/005788
DATED             : October 28, 2008
INVENTOR(S)       : Seiden It is certified that error appears in the above-identified patent and that said Letters Patent is hereby corrected as shown below:

Column 7, Line 18, Claim 11:

Delete "operate" and insert -- operating --.

Column 7, Line 19, Claim 11:

Delete "initiate" and insert -- metadata --.

Signed and Sealed this

Thirtieth Day of December, 2008

JON W. DUDAS
*Director of the United States Patent and Trademark Office*